United States Patent
Agulnik et al.

(10) Patent No.: US 9,516,123 B2
(45) Date of Patent: Dec. 6, 2016

(54) METHOD FOR PRESENCE INFORMATION SUBSCRIPTION IN A GROUP COMMUNICATIONS SYSTEM

(75) Inventors: Anatoly Agulnik, Deerfield, IL (US);
Tyrone D. Bekiares, Chicago, IL (US);
Peter M. Drozt, Prairie Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1453 days.

(21) Appl. No.: 12/544,508

(22) Filed: Aug. 20, 2009

(65) Prior Publication Data
US 2011/0047558 A1  Feb. 24, 2011

(51) Int. Cl.
G06F 3/00 (2006.01)
H04L 29/08 (2006.01)
H04W 4/08 (2009.01)

(52) U.S. Cl.
CPC ............. H04L 67/24 (2013.01); H04L 67/306 (2013.01); *H04W 4/08* (2013.01)

(58) Field of Classification Search
CPC ....... H04L 67/24; H04L 67/306; H04W 4/08
See application file for complete search history.

(56) References Cited

U.S. PATENT DOCUMENTS

| 2003/0041101 A1 | 2/2003 | Hansche et al. | |
| 2004/0041101 A1 | 3/2004 | Akutsu | |
| 2005/0135240 A1* | 6/2005 | Ozugur | 370/229 |
| 2006/0165058 A1 | 7/2006 | Caballero-McCann | |
| 2006/0211450 A1* | 9/2006 | Niekerk et al. | 455/558 |
| 2006/0248184 A1* | 11/2006 | Wu et al. | 709/224 |
| 2007/0121867 A1* | 5/2007 | Ozugur et al. | 379/201.1 |
| 2007/0124158 A1 | 5/2007 | Kakuta | |
| 2007/0266075 A1 | 11/2007 | Jachner | |
| 2008/0125157 A1* | 5/2008 | Zhang | 455/518 |
| 2008/0183866 A1 | 7/2008 | Maeda | |
| 2009/0150403 A1* | 6/2009 | Jerome et al. | 707/10 |
| 2009/0177729 A1* | 7/2009 | Ben Ezra et al. | 709/202 |

OTHER PUBLICATIONS

PCT International Search Report Dated November 8, 2010.
Kumar Singh V, et al. "A New SIP Event Package for Group Membership Management in Advanced Communications", Internet Multimedia Services Architecture and Applications, 2008; IMSAA 2008, 2nd International Conference on, IEEE, Piscataway, NJ, USA; Dec. 10, 2008, p. 1-6, XP031408582; ISBN:978-1-4244-2684-3, Fig 3, p. 3, Left Hand Column, Line 27; Right Hand Column, Line 20.

* cited by examiner

*Primary Examiner* — H S Sough
*Assistant Examiner* — Carina Yun
(74) *Attorney, Agent, or Firm* — Daniel R. Bestor

(57) ABSTRACT

In a group communications system, a group watcher module subscribes to presentities of interest for a particular group by communicating, to at least one presence server module, a set of subscriptions to a plurality of presentities, wherein each subscription contains a set of event notification criteria for a presentity. When the group watcher module detects a change in presence information for the set of subscriptions, it determines current members of the group and distributes the change in presence information to the current members.

7 Claims, 3 Drawing Sheets

मेथड FOR PRESENCE INFORMATION SUBSCRIPTION IN A GROUP COMMUNICATIONS SYSTEM

METHOD FOR PRESENCE INFORMATION SUBSCRIPTION IN A GROUP COMMUNICATIONS SYSTEM

FIELD OF THE DISCLOSURE

The present disclosure relates generally to group communications and more particularly to a method for presence information subscription in a group communications system.

BACKGROUND

With the advancement in technology, group communications systems are capable of providing better services to the users. In some applications such as Instant Messaging applications, a communication device in the group communications system may report (referred to in the art as "publishing" and also referred to herein as "updating") to a central network entity (referred to in the art as "presence server") status or presence information of the user (referred to in the art as a "presentity") of the communication device. The central network entity "notifies" other users (referred to in the art as "watchers") in the system who have subscribed to the central network entity to receive this presence information. The presence information can include information such as location of the communication device, current operation being performed by the device, availability of a user of the device, and the like. Presence information may also include information about methods of communication a user supports. For example, a common wireless phone may be only available for voice calls, whereas an office communications system may be available for voice, text messages or even video capability.

With the development of Session Initiation Protocol (SIP) SIMPLE, the SIP/SIMPLE protocol provides a means to communicate presence information. Conventionally, a user subscribes to a presentity to receive presence information associated with the presentity. Alternatively, a user can use a presence resource list to subscribe to multiple presentities via a single subscription. However, currently if a set of users wish to subscribe to the same presentity or a set of presentities, then each of the users has to individually subscribe to the presentity or presence resource list. Such an approach is inefficient for dynamically changing groups because each request occupies system bandwidth. For instance, the approach of explicit subscription by each member of a group results in a flood of subscription requests when a user changes groups or when a new user joins the group. Further, in the existing approach some presence information can be lost when the group membership changes. Also, currently no method is available to coordinate members of a group subscribed to the same set of presentities with the same notification criteria.

Accordingly, there is a need for a method for presence information subscription in a group communications system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
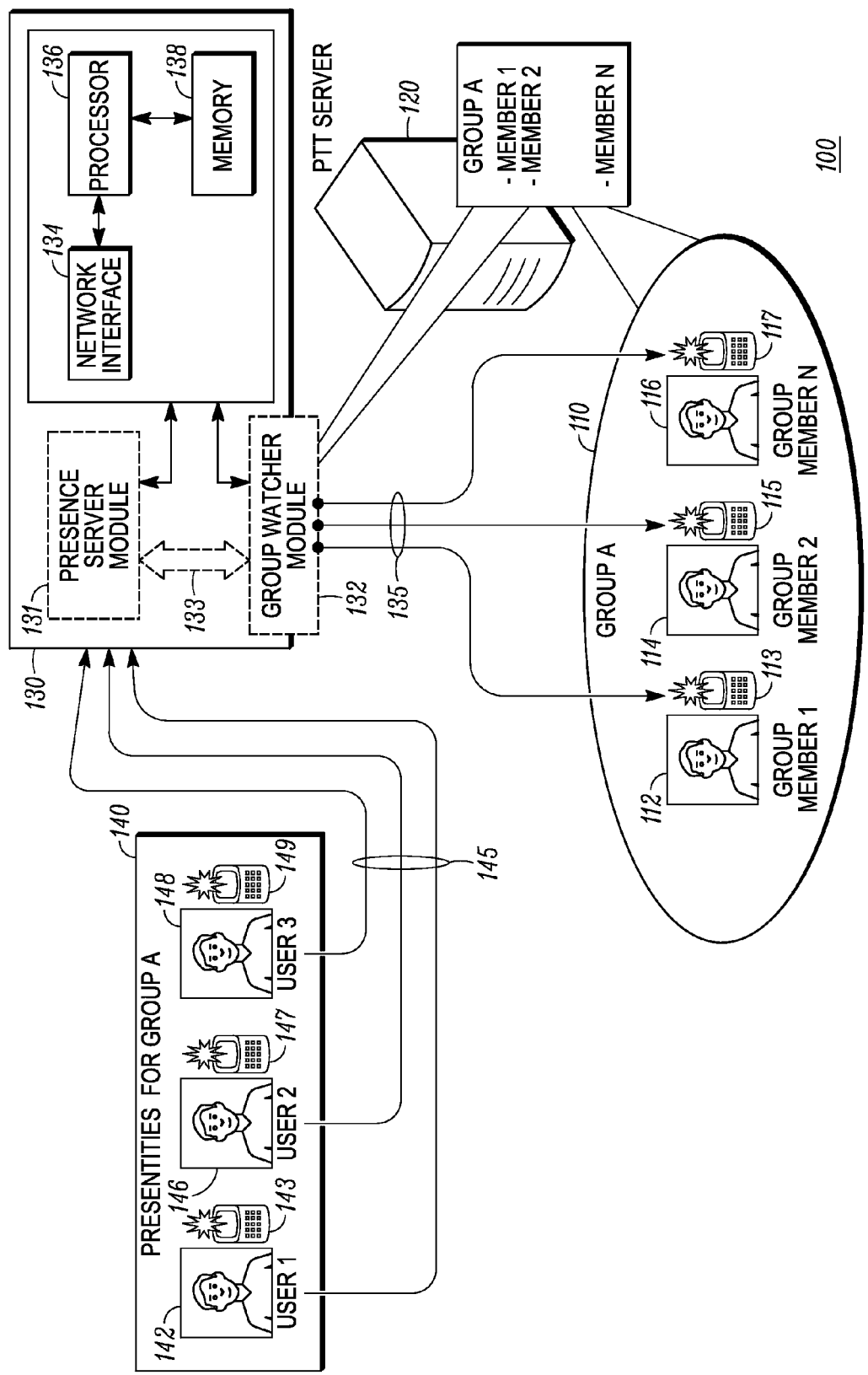
FIG. 1 is a block diagram of a group communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a group watcher module, in a group communications system, subscribes to a set of presentities of interest for a particular group by communicating, to at least one presence server module, a set of subscriptions to the plurality of presentities, wherein each subscription contains a set of event notification criteria for a presentity. When the group watcher module detects a change in presence information for the set of subscriptions, it determines current members of the group and distributes the change in presence information to the current members.

Referring now to the drawings, and in particular FIG. 1, a block diagram illustrating a group communications system is shown and indicated at 100. The group communications system 100 uses methods for presence information subscription for a group in accordance with embodiments of the present disclosure. Those skilled in the art, however, will recognize and appreciate that the specifics of the examples in this detailed description are merely illustrative of some embodiments and that the teachings set forth herein are applicable in a variety of alternative settings. For example, in the described embodiments, the presence server and the other entities in the group communication system 100 operate in accordance with SIP/SIMPLE and Open Mobile Alliance Push-to-Talk over Cellular (OMA PoC). However, the teachings described herein are in no way limited to this system implementation. Moreover, the system may include more groups, more presentities, more presence servers, and other entities than what is shown in FIG. 1.

The group communications system 100 comprises: a presence server 130 that includes a presence server module 131; a group watcher module 132; a group server 120, which in this case is a Push-to-Talk (PTT) server; and a plurality of users 112, 114, 116, 142, 146, and 148, that are all communicatively coupled over a network (not shown) for group presence subscriptions and corresponding presence information distribution, in accordance with the teachings herein. The network can be a wired network, a wireless network, or a network enabling both wired and wireless communications and usually includes a number of network infrastructure devices including, but not limited to, bridges, switches, zone controllers, base station controllers, repeaters, base radios, base stations, base transceiver stations, access points, routers or any other type of infrastructure equipment interfacing any entity in a wireless or wired environment.

Each of the users carries a communication device (also referred in here as "client entity") 113, 115, 117, 143, 147, and 149 to communicate with each other and with other network entities such as the presence server 130 and PTT server 120. The communication devices are also referred to in the art as access devices, access terminals, user equipment, mobile stations, mobile subscriber units, mobile devices, and the like, and can be any standard communication device such as radios, mobile phones, Personal Digital Assistants (PDAs), laptops, two-way radios, cell phones, and any other device capable of operating in a wired or wireless environment.

The communication devices include a memory, one or more network interfaces, and a processing device that are operatively coupled. The network interfaces can be used for, one or more of: communicating with the PTT server 120; sending presence information for a presentity to the presence server module 131; receiving presence information, from the group watcher module 132, for a set of subscriptions to a plurality of presentities, in accordance with the teachings herein; and other communications with the presence server 130 and group watcher module 132 to enable the implementation of methods in accordance with the teachings herein. The implementation of the network interfaces depends on the particular type of network, i.e., wired and/or wireless, to which the communication devices are connected. For example, where the network supports wired communications, the interfaces may comprise a serial port interface (e.g., compliant to the RS-232, standard), a parallel port interface, an Ethernet interface, a USB interface, and/or a FireWire interface, and the like. Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed in the processing device of the communication device through programmed logic such as software applications or firmware stored on the memory device of the communication device.

Besides the above-mentioned functionality, implemented via programmed logic or code, the processing device of each communication device is further programmed with logic or code for implementing methods such as method 300 described below by reference to FIG. 3. The memory in the communication devices can include short-term and/or long-term storage of various data, e.g., presence information, configuration information, etc., needed for the functioning of the communication device. The memory may further store software or firmware for programming the processing device with the logic or code needed to perform its functionality.

While connected to the system 100, some of the users may become members of a group, such as a Group A 110 comprising users 112, 114, and 116, to facilitate group communications. Group A can be, for example, a pre-arranged group or may be a nested group, a PoC ad-hoc group, etc. Also, Group A 110 may comprise more or less group members than shown in FIG. 1. In accordance with the teachings herein, upon becoming members of Group A 110, users 112, 114, and 116 receive presence information updates, for a set of subscriptions to a plurality of presentities, without having to explicitly subscribe to each presentity identified in the set of subscriptions.

A presentity, as the term is used herein, means a logical entity (that represents a device or person) described by presence information. For example, each member of Group A 110, upon becoming a member of the group, receives presence information for a set 140 of presentities that includes users 142, 146, and 148 and/or their devices 143, 147, and 149. The presentities in the set 140 may include fewer or more presentities than is shown in FIG. 1 or may include other types of presentities including, but not limited to, servers, applications, or other logical entities; and a sub-set of the plurality of presentities in the set 140 may be identified by a Presence Resource List (PRL), which is a pre-defined list of presentities (e.g., "Buddy List") that is traditionally subscribed to in a single operation by a watcher.

Moreover, presence information is defined as a dynamic set of information pertaining to a presentity that indicates status, reachability, willingness, and/or capabilities of a presentity to communicate. Presence information includes, but is not limited to, such status information as, for instance, user availability, location, network availability, user mood, moving direction, speed, destination, estimated time to reach a destination, distance from a destination, incident phase, completed percentage, stage, or phase of an assigned task during an incident, etc. In one embodiment, the presence feature that is implemented in the group communication system 100 is performed using proprietary protocols (such as protocols that implement the embodiments of the disclosure described by reference to FIGS. 2 and 3) or standard protocols, such as the Presence SIMPLE Specification (current draft dated Feb. 3, 2009) published by OMA that defines an application level specification for a SIP/SIMPLE-based presence service that makes use of the SIP (Session Initiation Protocol) protocol. The Presence SIMPLE Specification is also referred to herein as SIP/SIMPLE.

Turning now to the PTT server 120 of FIG. 1, although not shown, PTT server 120 includes at least one network interface, processing device, and memory operatively coupled for performing the functionality of the PTT server 120. More particularly, the network interface can be wired, wireless, or a combination of both (examples of which are given above) depending on the particular network to which the PTT server 120 is connected. The processing device (examples of which are given below) may be programmed with logic or code to perform its functions, wherein the logic is stored as software and or firmware in a suitable memory device; and/or the processing device may be implemented as a state machine or ASIC.

In operation, PTT server 120 stores group membership information for one or more groups in communication system 100, such as Group A 110. The group membership information identifies the one or more groups and the members that constitute the groups. In one illustrative example, the group membership information includes, but is not limited to, group identifiers, and identifiers for the members of each group, wherein the identifiers may include one or more of: a group name or ID, a user name or ID, a device ID, an Internet Protocol address, a phone number, or any other information such as a SIP Uniform Resource Identifier (URI) that may be used to identify a particular group and its members. In the illustrative example shown in FIG. 1, the PTT server 120 stores membership information about Group A 110 and the group members (1-N) that constitute Group A 110; and the PTT server 120 sends at least some of this group membership information to the group watcher module 132 to facilitate implementation of embodiments of the disclosure.

The PTT server 120 may also manage group memberships for the groups in system 100. In accordance with this embodiment, one or more of the users explicitly joins and becomes a member of the group via message signaling between their communication devices and the PTT server 120 using proprietary or standard protocols such OMA PoC, which is described, for instance, in a group of documents referred to as OMA PoC v 2.0, dated Aug. 6, 2008,, and a group of documents referred to as OMA PoC v 2.1, dated Dec. 23, 2008. In the OMA PoC example implementation, the communication devices 113, 115, and 117 each exchange SIP signaling (e.g., a sequence of SIP INVITE, OK, ACK transactions) with the PTT server 120 to establish a session for the communication group 110 (e.g., a talkgroup when the media being exchanged is voice). Alternatively to using SIP signaling, the user can use any method, including any existing method, to become a group member via the PTT server 120. Moreover, a user can become a group member implicitly, without sending any messages to the PTT server 120, such as for instance being pre-configured as a member of a pre-arranged group, being added to an existing group by an operator, an application server, or another authorized user in the system 100, etc.

Turning now to the presence server 130, it includes a memory 138, one or more network interfaces 134, and a processing device 136 operatively coupled for performing the functionality of the presence server 130. The network interfaces 134 can be wired, wireless, or a combination of both (examples of which are given above) depending on the particular network to which the presence server 130 is connected. The processing device 136 (examples of which are given below) may be programmed with logic or code to perform its functions (such as the functions performed by the presence server module 131 and the group watcher module 132), wherein the logic is stored as software and or firmware in the memory 138 (examples of which are given above); and/or the processing device 136 may be implemented as a state machine or ASIC. Only one presence server is shown in FIG. 1 for ease of illustration. However, any number of presence servers may be included in system 100 depending on customer needs and system requirements. Also, in this illustrative embodiment, the presence server performs functionality in accordance with SIP/SIMPLE and further performs functionality to facilitate embodiments of the disclosure.

Presence server module 131 represents a logical entity or, more particularly, functions that are carried out in the presence server 130 with support from the different hardware units such as the network interface 134, the processing device 136, and the memory 138 of the presence server 130. The functions of the presence server module 131 include, but are not limited to, receiving and storing the presence information pertaining to presentities in the system 100, communicating change in presence information to the group watcher module 132, and the like. For example, as shown in FIG. 1, the presence server module 131 receives presence information 145 pertaining to the set of presentities 140 for Group A 110.

Group watcher module 132 also represents a logical entity or, more particularly, functions that are carried out with support from different hardware units such as a network interface, a processing device, and memory of an infrastructure device in system 100. In one embodiment, the group watcher module is implemented on the presence server 130 and communicates with the presence server module 131 using internal "signaling", such as known communication techniques between various processing modules housed within a single physical device. In an alternative embodiment, the group watcher module is implemented on a separate device, such as the PTT server or a stand-only server, from the presence server and communicates with the presence server module 131 using, for example, SIP signaling.

The functions of the group watcher module 132 include, but are not limited to, communicating to a presence server module a set of subscriptions, detecting a change in presence information, determining current group members, distributing the presence information to current group members, and the like. Specifically, the group watcher module 132 collects presence information 133 from the presence server module 131 and distributes the collected information to the group members. The group watcher module 132 collects the group membership information from the PTT server 120. In one example implementation, group watcher module 132 in FIG. 1 collects from the presence server module 131 the presence information 133 of the presentities for which the group watcher module has subscribed for; retrieves information about current members of Group A 110 from the PTT server 120; and distributes the presence information 135 to all the members of Group A 110.

Figure 2:
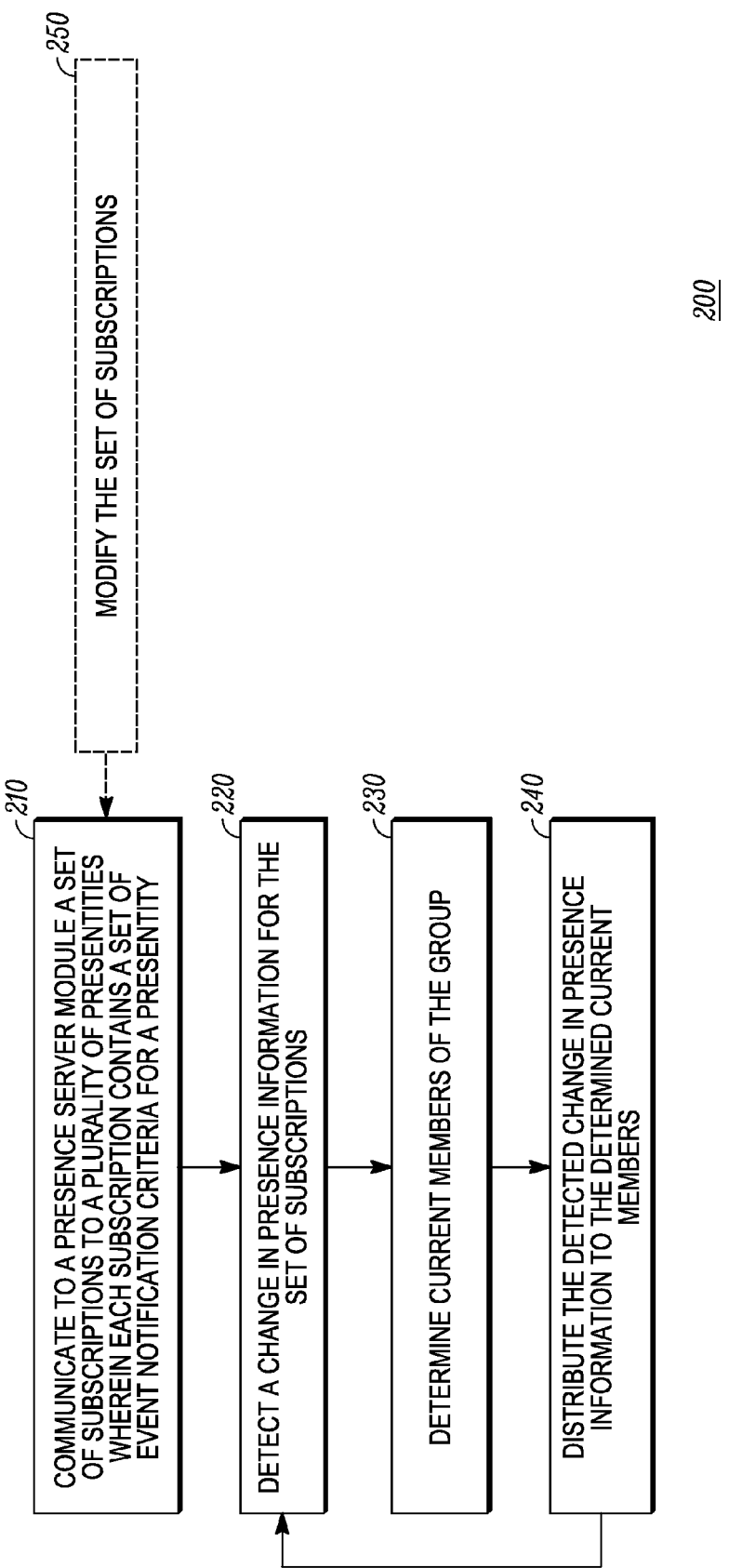
FIG. 2 is a flowchart of a method, at a group watcher module, for subscription to presence information for a group in accordance with some embodiments.

Turning now to FIG. 2, a flow diagram illustrating a method for subscription to presence information for a group in a group communications system in accordance with some embodiments is shown and indicated at 200. Any logical entity, such as the group watcher module 132 (also referred herein as a "group watcher") shown in FIG. 1, performs at least some of the steps of the method 200, although one or more steps of the method illustrated at 200 can be performed at one or more supporting hardware units external to the group watcher. Moreover, with respect to the description herein, functionality illustrated and described by reference to the flow diagrams of FIGS. 2 and 3 can be performed by means of, for example, a processing device (examples of which are given below) programmed with logic or code to perform its functions, wherein the logic is stored as software and or firmware in a suitable memory device; and/or a processing device implemented as a state machine or ASIC.

At 210, the group watcher communicates to a presence server module a set (one or more) of subscriptions to a plurality of presentities, wherein each subscription contains a set of event notification criteria for a presentity. As the term is used herein, a subscription is a request for certain presence information about a presentity. Event notification criteria for a presentity means one or more criteria defined by a watcher and evaluated by the presence server module to determine under what circumstances the group watcher is to receive the presence information and/or updates to the presence information for that presentity. In accordance with some embodiments, the size of the set of event notification criteria can be zero.

As mentioned above, each subscription in the set of subscriptions contains a set of event notification criteria and identifies a particular presentity to which those criteria are applied. Therefore the set of subscriptions define the presence information about the presentities which are relevant to the group members; and the set of event notification criteria determines the type of presence information and the notification updates for a particular presentity. Different subscriptions from the set of subscriptions may contain: the same set of event notification criteria but for different presentities; a different set of event notification criteria for the same presentity; or different event notification criteria for different presentities (for example, a subscription for one presentity includes a set of event notification criteria, and a subscription for a different presentity includes a different set of event notification criteria).

Moreover, it is important to note that in accordance with the teachings herein, it is the group watcher (and not each individual member of the group) that subscribes to the presentities for the group by communicating to the presence server module, the set of subscriptions for the plurality of presentities. In other words, the group watcher represents the entire group by performing the subscription methods for the group. Thus, before becoming a member of the group, a user is unaware of the subscriptions for the group; and accordingly, users (group members) need not individually explicitly subscribe to a presence server to receive presence information related to the plurality of presentities. Rather, each member can be said to have an "implicit" subscription to receive the presence information for the plurality of presentities simply by virtue of joining the group, which is different from what is currently done in the art.

How the group watcher communicates the set of subscriptions to the presence server module depends on the particular system implementation. For example, where the group watcher and the presence server module are present in a single (the same) infrastructure entity, such as the presence server 130, the group watcher internally (for instance as described above) communicates the set of subscriptions to the presence server module. However, where the group watcher is not co-located with the presence server module on the same device or where the group watcher communicates the set of subscriptions to a plurality of presence server modules within different physical presence server devices, the subscription process can be based on a SIP SUBSCRIBE method similar to the method described in the SIP/SIMPLE standard, and related SIP reply and/or acknowledgement messages. Where the group watcher communicates the set of subscriptions to multiple presence servers, the group watcher sends different subsets of the subscriptions to each of the different presence servers.

Turning back to method 200, at 220, the group watcher detects a change in presence information for the set of subscriptions. The change can be an initial notification by the presence server module of presence information pertaining to a presentity identified in the set of subscriptions, wherein the initial notification of the presence information meets an event notification criteria for that presentity; or the change in presence information can be an update to a particular type of presence information previously reported to the group watcher. Communications of the change in presence information from the presence server module to the group watcher can be via internal signaling where these two modules are co-located. Alternatively, when the presence server module and the group watcher are not co-located on the same device or where the group watcher has sent subsets of the set of subscriptions to different presence server modules, the signaling can be based on a SIP NOTIFY method similar to the method described in the SIP/SIMPLE standard, which uses a SIP NOTIFY message and related SIP reply and/or acknowledgement messages.

At 230, responsive to the detecting, the group watcher determines current members of the group to which the change in the presence information is to be distributed. For example, in an illustrative implementation, the group watcher retrieves the current group membership information (e.g., in the form of identifiers for the current group members) from a group server, such as the PTT server 120. As described earlier, the PTT server manages and stores group membership information for one or more groups in the group communications system. The group watcher dynamically retrieves the current group membership information when there is a need for it. In accordance with an alternate embodiment, the group watcher manages and caches (stores) the group membership information and modifies the membership list as updates to it are received in order to maintain the current group members. For example, the group watcher module 132 stores identifiers for the members 1, to N of Group A 110, and updates those identifiers upon detecting (e.g., from the PTT server 120) that a new member is added or an existing member is removed from the group.

At 240, the group watcher distributes the detected change in the presence information to the determined current members. In the SIP/SIMPLE implementation, the group watcher distributes the changes to the presence information for presentities in the set of subscriptions using a SIP NOTIFY method similar to the method described in the SIP/SIMPLE standard, which uses a modified SIP NOTIFY message (e.g., with extensions) and related SIP reply and/or acknowledgement messages. In order to adhere to the SIP/SIMPLE standard, a dialog must be established using the SIP SUBSCRIBE method to enable the SIP NOTIFY method to be used to send presence information to an entity such as the client entity. However, in accordance with the present teachings, the client entities are not aware of the particular subscriptions for any group that they join; the group watcher manages those subscriptions. Thus a new "open subscription" method, which is described in more detail below, allows the client entities to establish such a SIP dialog to receive the presence information from the group watcher using SIP signaling. In accordance with alternate embodiments, the detected change in the presence information can be distributed by using messages such as via Short Message Service (SMS) messaging. After distributing the presence information, the group watcher continues to detect (220) if there are further changes in the presence information for the set of subscriptions.

In accordance with another embodiment, at 250, the group watcher modifies the set of subscriptions and sends the new set of subscriptions to the one or more presence server modules, which allows different presence information than before to be sent to and received by the group members. The modification to the subscription can occur at any time and is therefore independent of the other steps of method 200. Moreover, the group watcher can modify the set of subscriptions in one or more of the following ways. The group watcher can change the set of event notification criteria for at least one subscription in the set. For example, the notification criteria for a subscription can be basic information such as "in the office" or "out of the office" but a change in the notification criteria can be requested for more detail such as to indicate every meeting which a user is attending. The group watcher can add or remove a presentity from the plurality of presentities, which correspondingly adds or removes a subscription from the set of subscriptions. In addition, the group watcher can otherwise add or delete a subscription to the set of subscriptions. For example, a group may be interested in getting presence information about all the security guards. When a new security guard is hired, an administrator updates the group watcher for this group to include the new employee and the watcher will initiate a new subscription.

Figure 3:
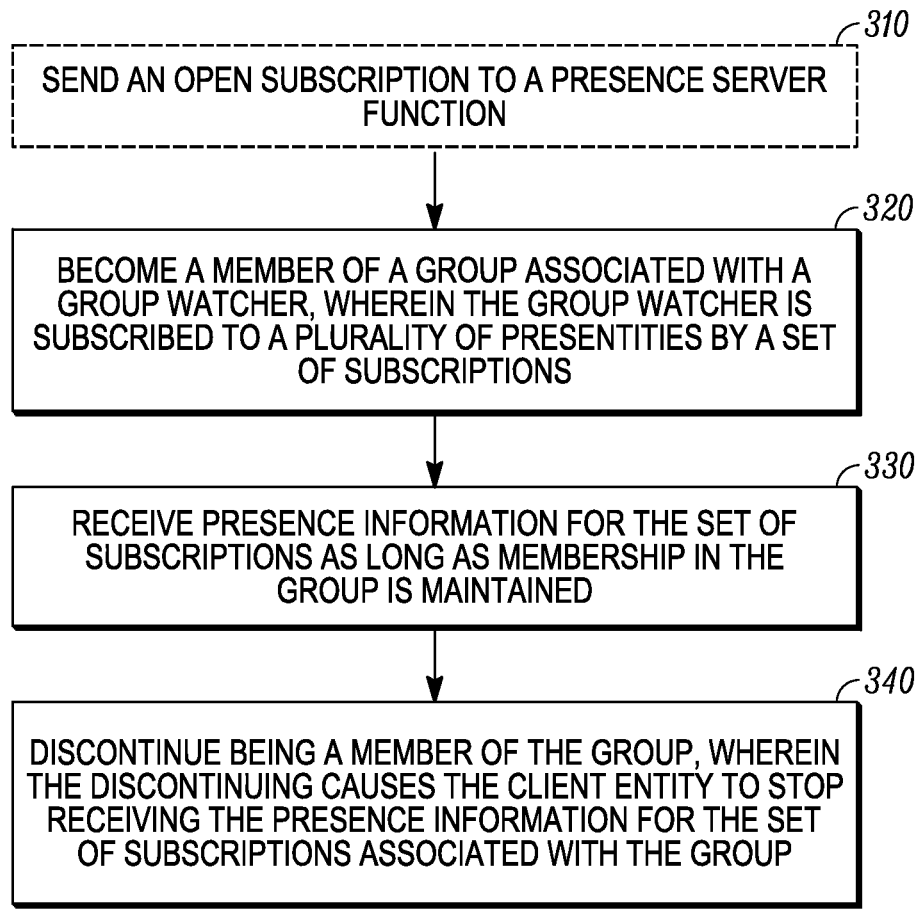
FIG. 3 is a flowchart of a method, at a client entity, for presence information subscription in accordance with some embodiments.

Turning now to FIG. 3, a flow diagram illustrating a method of presence information subscription for a group for the users/client entities in a group communications system in accordance with some embodiments is shown and indicated at 300. Any client entity, such as the communication device 113 associated with the user 112 as shown in FIG. 1, performs at least some of the steps of the method 300, although one or more steps of the method illustrated at 300 can be performed at one or more supporting hardware units external to the group watcher. In accordance with some embodiments, at 310, as mentioned above for a SIP/SIMPLE implementation, a group member can send an "open subscription" to the presence server module to open a SIP dialog to enable the group watcher to notify the group member of presence information using the SIP NOTIFY method. In this implementation, the open subscription comprises a SIP SUBSCRIBE method similar to the method described in the SIP/SIMPLE standard, which uses a modified SIP SUBSCRIBE message (e.g., with extensions) and related SIP reply and/or acknowledgement messages. The open subscription does not identify any presentities or event notification criteria for presentities, but associates (or binds if you will) the resulting SIP dialog to any group that the client entity joins to enable the client entity to receive presence information for any set of subscriptions associated with any group to which the client entity is a member. Of course, the presence server module communicates to the group watcher any information it needs to use the established SIP dialog to send a SIP NOTIFY message containing current presence information to the group member.

At 320, the client entity becomes a member of a group which is associated with a group watcher. As described above, a user can become a group member by any number of ways. However, regardless of the means by which the user becomes a group member, as a result of becoming a member the user starts receiving (330) presence information according to the set of subscriptions associated with this group, wherein the set of subscriptions are for a plurality of presentities and were subscribed to by the group watcher for the group. Also, as described above, the presence information the group member receives may change as a result of the group watcher modifying the set of subscriptions associated with the group. The group member continues to receive the presence information for the group until the group member discontinues being a member the group, at 340, which can be done using explicit signaling by the client entity (e.g., via a SIP BYE method) or being removed from the membership of the group, for example by being reconfigured, being removed by an operator or other authorized user, etc. By virtue of the user no longer being a member of the group, the group watcher module will no longer provide presence updates relevant to the group. No further action is needed by the client entity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for receiving presence information, the method comprising: at a client entity:
   becoming a member of a Push-to-Talk (PTT) group, wherein the group is subscribed, on a group basis, to a plurality of presentities by a set of subscriptions, wherein each subscription contains a set of event notification criteria for a presentity; and
   as a result of becoming a member of the PTT group and without explicitly subscribing to receive presence information related to the plurality of presentities, receiving presence information for the set of subscriptions as long as membership in the group is maintained.

2. The method of claim 1 further comprising the client entity receiving different presence information as a result of a group watcher module modifying the set of subscriptions by changing the set of event notification criteria for at least one subscription.

3. The method of claim 1 further comprising the client entity receiving different presence information as a result of a group watcher module modifying the set of subscriptions by adding or removing a presentity from the plurality of presentities.

4. The method of claim 1 further comprising the client entity receiving different presence information as a result of a group watcher module modifying the set of subscriptions by adding a subscription to the set of subscriptions or deleting a subscription from the set of subscriptions.

5. The method of claim 1 further comprising sending, to a presence server, a request for an open subscription, which allows a Session Initiation Protocol (SIP) NOTIFY method to be used to send presence information to the client entity, wherein the presence information is for any set of subscriptions associated with any group to which the client entity is a member.

6. The method of claim 1 further comprising the client entity discontinuing being a member of the group, which causes the client entity to stop receiving the presence information for the set of subscriptions associated with the group.

7. A user communication device capable of receiving presence information, the user communication device comprising:
   a processing device that is configured to join a Push-to-Talk (PTT) group, wherein the group is subscribed, on a group basis, to a plurality of presentities by a set of subscriptions and wherein each subscription contains a set of event notification criteria for a presentity, and as a result of joining the PTT group and without explicitly subscribing to receive presence information related to the plurality of presentities, receive presence information for the set of subscriptions as long as membership in the group is maintained.

* * * * *